United States Patent
Zavatone et al.

(10) Patent No.: US 9,152,539 B2
(45) Date of Patent: Oct. 6, 2015

(54) TAG-BASED GRAPHICAL USER INTERFACE PRODUCTION SYSTEMS AND METHODS

(75) Inventors: Alex Zavatone, Irving, TX (US); Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 834 days.

(21) Appl. No.: 13/197,678

(22) Filed: Aug. 3, 2011

(65) Prior Publication Data
US 2013/0036375 A1 Feb. 7, 2013

(51) Int. Cl.
G06F 9/44 (2006.01)
G06F 11/36 (2006.01)
G06F 3/048 (2013.01)

(52) U.S. Cl.
CPC ............ *G06F 11/3664* (2013.01); *G06F 3/048* (2013.01); *G06F 8/38* (2013.01); *G06F 9/44* (2013.01)

(58) Field of Classification Search
CPC ..... G06F 11/36; G06F 3/048; G06F 11/3664; G06F 8/38; G06F 9/44
See application file for complete search history.

(56) References Cited

U.S. PATENT DOCUMENTS

| | | | |
|---|---|---|---|
| 7,694,272 B2 * | 4/2010 | Bronicki et al. | 717/109 |
| 7,984,384 B2 * | 7/2011 | Chaudhri et al. | 715/779 |
| 8,522,196 B1 * | 8/2013 | Kim et al. | 717/105 |
| 2004/0095388 A1 * | 5/2004 | Rocchetti et al. | 345/763 |
| 2005/0010901 A1 * | 1/2005 | Udler | 717/109 |
| 2005/0251380 A1 * | 11/2005 | Calvert et al. | 703/22 |
| 2006/0168577 A1 * | 7/2006 | Melo et al. | 717/168 |
| 2007/0006152 A1 * | 1/2007 | Ahmed et al. | 717/122 |
| 2009/0193388 A1 * | 7/2009 | Nojiri et al. | 717/101 |
| 2012/0089929 A1 * | 4/2012 | Ohta et al. | 715/762 |
| 2012/0324353 A1 * | 12/2012 | Torbey et al. | 715/716 |
| 2013/0227572 A1 * | 8/2013 | Hosono | 718/1 |

OTHER PUBLICATIONS

Charles McLean et al., "An Architecture for a Generic Data-Driven Machine Shop Simulator", [Online], 2002, pp. 1108-1116, [Retrived from Internet on Jun. 24, 2015], <http://citeseerx.ist.psu.edu/viewdoc/download?doi=10.1.1.1.5427&rep=rep1&type=pdf>.*

Pedro J. Molina et al., "Just-UI: A User Interface Specification Model", [Online], 2002, pp. 63-74, [Retrieved from Internet on Jun. 24, 2015], <http://download.springer.com/static/pdf/352/chp%253A10.1007%252F978-94-010-0421-3_5.pdf>.*

(Continued)

*Primary Examiner* — Thuy Dao
*Assistant Examiner* — Ziaul A Chowdhury

(57) ABSTRACT

An exemplary method includes a graphics export module 1) generating, based on design data representative of a graphics design, computing code configured to be processed by a target computing device to render graphics within a graphical user interface in accordance with the graphics design, 2) inserting a production tracing tag in the computing code, the production tracing tag configured to be used to access production data associated with production of the computing code, and 3) exporting the computing code including the production tracing tag for access by at least one graphics production subsystem. In certain examples, the method may further include graphics export module generating the production data associated with the production of the computing code and exporting the production data for storage in a data storage repository communicatively coupled to the graphics export module. Corresponding methods and systems are also disclosed.

21 Claims, 10 Drawing Sheets

(56) References Cited

OTHER PUBLICATIONS

Quentin Limbourg et al., "USIXML: a Language Supporting Multi-Path Development of User Interfaces", [Online], pp. 1-19, [Retrieved from Internet on Jun. 24, 2015], <http://www.info-ab.uclm.es/personal/VictorManuelLopez/mipagina/archivos/Limbourg-DSVIS-EHCI2004.pdf>.*

T. Dean Hendrix, "An Extensible Framework for Providing Dynamic Data Structure Visualizations in a Lightweight IDE", [Online], pp. 387-391, [Retrieved from Internet on Jun. 24, 2015], <http://citeseerx.ist.psu.edu/viewdoc/download?doi=10.1.1.148.1071&rep=rep1&type=pdf>.*

\* cited by examiner

Computing Code
206

Comments:
//
...
Production_Tracing_Tag: ⎯⎯⎯⎯⎯⎯⎯ ⌒402
[6299477380]
...

//

Body:
{

| LAYERS | |
|---|---|
| ☐☐☐ ▷ ☐ Production Information —706-2 ○ | 702-2 |
| 👁☐☐ ▷ ☐ left arrow —706-1 ○ | 702-1 |
| 👁☐☐ ▷ ☐ right arrow —704-1 ○ | |
| 👁☐☐ ▷ ☐ list slot 3 selected ○ | |
| 👁☐☐ ▷ ☐ slug up ○ | |
| 👁☐☐ ▷ ☐ slug down ○ | |
| 👁☐☐ ▷ ☐ txt header ○ | |
| 👁☐☐ ▷ ☐ header left ○ | |
| 👁☐☐ ▷ ☐ header mid - w ○ | |
| ☐☐☐ ▷ ☐ mag selected reference – X ○ | |
| 👁☐☐ ▷ ☐ mag selected ○ | |
| 👁☐☐ ▷ ☐ Live TV ○ | |
| 👁☐☐ ▷ ☐ shadow right ○ | |
| 👁☐☐ ▷ ☐ txt counter ○ | |
| 👁☐☐ ▷ ☐ mode bg right – w ○ | |
| 👁☐☐ ▷ ☐ mode bg mid – w ○ | |
| 👁☐☐ ▷ ☐ mode bg left ○ | |
| 👁☐☐ ▷ ☐ Mode bg left – H ○ | |
| 👁🔒☐ ▷ ☐ video - x ○ | |

Fig. 7

TAG-BASED GRAPHICAL USER INTERFACE PRODUCTION SYSTEMS AND METHODS

BACKGROUND INFORMATION

Advances in computing technologies have led to a proliferation of computing devices in modern society. Myriad computing devices having various shapes, sizes, and capabilities have been made available to consumers. For example, consumers may choose from computing devices such as mobile phones, smart phones, tablet computers, e-reader devices, personal computers, media players, gaming devices, set-top-box ("STB") devices, digital video recorder ("DVR") devices, Global Positioning System ("GPS") devices, and other types of computing devices.

The proliferation of computing devices has challenged designers, developers, and testers of graphical user interfaces for the computing devices. For example, the competitive landscapes between manufacturers of computing devices, between providers of applications that run on computing devices, and between providers of services accessed through the computing devices have pushed designers, developers, and testers of graphical user interfaces to design, develop, and test graphical user interfaces as efficiently as possible without sacrificing quality.

Traditional processes for design, development, and testing of graphical user interfaces have not kept pace with the demands placed on the designers, developers, and testers of the graphical user interfaces. To illustrate, in a traditional design, development, and testing process, a designer utilizes a graphical user interface design tool to design graphics (e.g., a screen layout of graphical elements) to be included in a graphical user interface. Once the graphics design is complete, the designer provides information about the graphics design to a developer who is responsible for producing computing code configured to be executed by a computing device to render a graphical user interface that includes the graphics designed by the designer. The developer provides the computing code to a tester who is responsible for testing the computing code. This process is typically compartmentalized, with the designer, developer, and tester working in separate environments and without effective tools for efficiently collaborating and/or sharing resources across the separate environments. The production of graphical user interfaces is often slowed and/or otherwise adversely affected by the lack of such tools, especially when large production teams are involved in the production of graphical user interfaces.

As an example, a tester may identify a "bug" in graphical user interface computing code. In a conventional computing code design, development, and testing process, significant time may be wasted by the tester to determine which of the various personnel who have worked on the production of the computing code is responsible for the bug and/or for fixing the bug. During the course of designing, developing, and testing the computing code, various designers, developers, and/or testers may have worked on the code, making the task of identifying the responsible personnel difficult. Moreover, due to the passage of time, designers, developers, and/or testers who worked on the computing code may not remember the exact work that they performed on the computing code and may be unsure about and/or reluctant to accept responsibility for the bug and/or for fixing the bug, or may disagree over who introduced the bug into the computing code.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 4 illustrates an exemplary portion of computing code that includes a production tracing tag according to principles described herein.

FIG. 7 illustrates an ordered list of layers associated with a graphics screen design according to principles described herein.

DETAILED DESCRIPTION OF PREFERRED EMBODIMENTS

Figure 1:
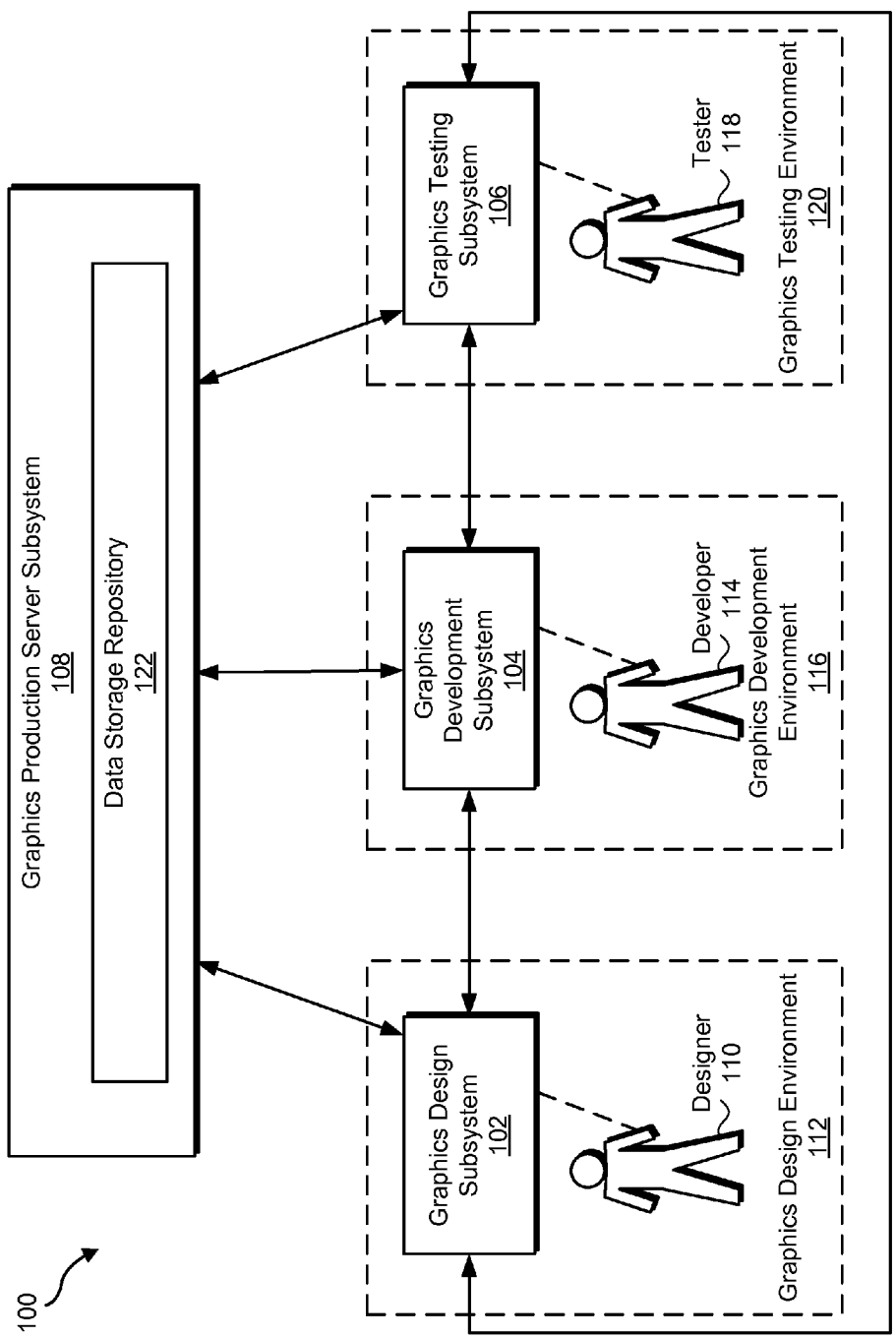
FIG. 1 illustrates an exemplary graphical user interface production system according to principles described herein.

Exemplary tag-based graphical user interface ("GUI") production systems and methods are described herein. In an exemplary method, a graphics export module 1) generates, based on design data representative of a graphics design, computing code configured to be processed by a target computing device (e.g., an end-user computing device) to render graphics within a GUI in accordance with the graphics design, 2) inserts a production tracing tag in the computing code, and 3) exports the computing code including the production tracing tag for access by at least one graphics production subsystem. The production tracing tag is configured to be used by the at least one graphics production subsystem (e.g., a graphics development subsystem, a graphics testing subsystem, a graphics design subsystem, a project management subsystem, and/or any other appropriately configured graphics production subsystem included in a GUI production system) to access production data associated with production of the computing code. As described herein, this may allow production subsystems, as well as personnel operating the production subsystems within respective production environments, to use the production data associated with production of the computing code in, and/or in relation to, one or more production operations (e.g., design, development, testing, and/or project management operations) associated with production of a GUI and/or graphics to be included in a GUI. In addition, each of the production subsystems in the GUI production system may be configured to update the production data (e.g., add to and/or modify the production data) to include information about design, development, testing, and/or project management operations performed in relation to production of the computing code.

Access and use of graphics production data (by way of the production tracing tag) across graphics design, development, and testing environments, as described herein, may create a graphics production environment that facilitates collaborative, effective, and/or efficient production of a GUI and/or graphics to be included in a GUI. The use of a production tracing tag to access production data as described herein may make production operations and/or personnel readily traceable by one or more production subsystems and/or personnel operating the production subsystems. In some implementations, the use of a production tracing tag to facilitate access to production data may allow a timeline for production of a GUI and/or graphics to be included in a GUI to be reduced compared to typical timelines for production of a GUI and/or graphics to be included in a GUI in accordance with conventional GUI production processes. Additionally or alternatively, collaboration between separate graphics production environments (e.g., design, development, and testing environments) may be improved compared to the disconnected, ad hoc collaboration that is common in conventional graphics production environments. These and/or other benefits provided by the disclosed exemplary systems and methods will be made apparent herein.

As used herein, the term "GUI" refers to a user interface that may be provided by a computing device to allow a user to interact with the computing device by way of the contents displayed within the GUI. The contents of the GUI may include one or more graphical elements visually arranged to form graphics that may be displayed within the GUI. Thus, the term "graphics" may refer to any grouping of one or more graphical elements, such as a grouping of graphical elements visually arranged to form a GUI screen or a portion of a GUI screen that may be displayed within a GUI. A graphical element may include any element that may be visually displayed within a GUI. For example, a graphical element may include an image, text, or a combination of an image and text that may be displayed within a GUI. Examples of graphics made up of one or more graphical elements may include, without limitation, a scroll bar, a navigation arrow, a button, a selector, a menu, a selectable menu option, a GUI screen, and any other grouping of one or more graphical elements.

A GUI and/or graphics that may be included in a GUI may be produced by the tag-based GUI production systems and methods described herein. The terms "GUI production" and "graphics production," may be used interchangeably herein to refer to any tasks and/or operations related to design, development, and/or testing of a GUI and/or graphics that may be included in a GUI. As described herein, such production may include production of computing code (e.g., generation, development, and testing of computing code) configured to be processed by a target computing device to render a GUI and/or graphics within a GUI in accordance with a design of the GUI and/or graphics within the GUI.

Exemplary tag-based GUI production systems and methods will now be described in reference to the accompanying drawings.

FIG. 1 illustrates an exemplary GUI production system 100 ("system 100"), which may be configured to produce a GUI and/or graphics that may be included in a GUI. For example, within system 100, a graphics design may be created, and computing code configured to be processed by a target computing device to render graphics in a GUI in accordance with the graphics design may be generated, developed, and tested. As shown in FIG. 1, system 100 may include a graphics design subsystem 102 ("design subsystem 102"), a graphics development subsystem 104 ("development subsystem 104"), a graphics testing subsystem 106 ("testing subsystem 106"), and a graphics production server subsystem 108 ("server subsystem 108"), which may be configured to communicate or otherwise interface with one another as shown.

Subsystems 102, 104, 106, and 108 shown in FIG. 1 are examples of "production subsystems," which term, as used herein, refers to any subsystem included in production system 100 that is configured to perform one or more operations related to production of graphics as described herein. While FIG. 1 illustrates examples of productions subsystems, additional or alternative production subsystems may be included in other embodiments. For example, a project management subsystem may be included in other embodiments.

Design subsystem 102 may be operated by a designer 110, which may include one or more people or groups of people (e.g., design teams) tasked with using design subsystem 102 to design graphics. Design subsystem 102 and designer 110 may be part of a graphics design environment 112 ("design environment 112") within which graphics design tasks and operations are performed to generate graphics designs and/or computing code based on the graphics designs.

Development subsystem 104 may be operated by a developer 114, which may include one or more people or groups of people (e.g., development teams) tasked with using development subsystem 104 to develop computing code for graphics. Development subsystem 104 and developer 114 may be part of a graphics development environment 116 ("development environment 116") within which graphics development tasks and operations are performed to develop computing code for graphics (e.g., by adding functionality to computing code and/or generating one or more builds of the computing code for testing and/or release).

Testing subsystem 106 may be operated by a tester 118, which may include one or more people or groups of people (e.g., testing teams, quality assurance ("QA") teams, etc.) tasked with using testing subsystem 106 to test computing code for graphics. Testing subsystem 106 and tester 118 may be part of a graphics testing environment 120 ("testing environment 120") within which graphics testing tasks and operations are performed to test computing code for graphics (e.g., to test one or more computing code builds generated by development subsystem 104).

Design environment 112, development environment 116, and testing environment 120 may be separate production environments. For example, each environment may include separate computing systems and/or personnel operating the computing systems. The computing system in each environment may be configured for operations specific to that environment. For example, design subsystem 102 may be configured to perform operations associated with design of graphics and generation of computing code for the graphics, development subsystem 104 may be configured to perform operations associated with development of computing code for the graphics, and testing subsystem 102 may be configured to perform operations associated with testing of computing code for the graphics. Although the design, development, and testing environments 112, 116, and 120 are separate from one another, in certain embodiments, design subsystem 102, development subsystem 104, and testing subsystem 106 may be configured to communicate with one another in any of the ways described herein. Additionally or alternatively, design subsystem 102, development subsystem 104, and testing subsystem 106 may be configured to communicate with server subsystem 108 in any of the ways described herein.

Server subsystem 108 may be configured to communicate with design subsystem 102, development subsystem 104, and testing subsystem 106 using any suitable communication technologies. In certain embodiments, server subsystem 108 may be configured to provide notification messages to design subsystem 102, development subsystem 104, and/or testing subsystem 106 in response to predetermined events. For example, as described herein, server subsystem 108 may be configured to provide notification messages to design subsystem 102, development subsystem 104, and/or testing subsystem 106 in response to one or more operations related to a data storage repository 122 ("repository 122") included in server subsystem 108, such as an addition of specific data associated with graphics to repository 122. In some embodiments, a notification message may include information configured to be used by design subsystem 102, development subsystem 104, and/or testing subsystem 106 to access specific data in repository 122. In other embodiments, design subsystem 102, development subsystem 104, and/or testing subsystem 106 may obtain such information from other sources, such as from computing code generated by design subsystem 102 as described herein.

Repository 122 may include data and/or computing code representative of one or more graphics that are being or were produced by system 100. For example, graphics computing code generated by design subsystem 102 and/or development subsystem 104 may be stored in repository 122.

Additionally or alternatively, repository 122 may include graphics production data associated with the production of one or more graphics that are being or were produced by system 100. The production data may include any data representative of information and/or content associated with production of one or more graphics. For example, the production data may include, without limitation, data indicative of or otherwise related to a party involved in the production of graphics (e.g., a designer who created a graphics design of graphics, a developer who developed or is tasked with developing computing code for graphics, and/or a tester who tested or is tasked with testing computing code for graphics), times that production tasks or operations were performed, times that computing code for graphics is checked out and/or checked in by a designer, developer, and/or tester through an asset reservation application, assignments of production tasks related to the graphics to a designer, developer, and/or tester, and any other data indicative of production operations that have been performed, who performed the production operations, and/or when the production operations were performed. As another example, the production data may include, without limitation, data representative of graphics comparables (e.g., one or more files included data representative of graphics screen comparables referred to as "screen comps") that are illustrative of a designer's desired visual layout of graphics, source code for a graphics design and/or graphics, instructions provided by a designer for use by a developer and/or tester in developing and/or testing graphics computing code, sources of graphics content (e.g., source image files), graphics design dimensions, graphics screen positions, times that builds of computing code were generated, incident reports (e.g., information indicative of "bugs" or other incidents identified by a tester), and any other data associated with content, design, development, and/or testing of graphics.

The production data may include design production data associated with production of a graphics design. The design production data may be provided by design subsystem 102 to server subsystem 108 for storage in repository 122 and may include any information and/or content associated with a graphics design and/or production operations related to production of the graphics design. For example, the design production data may indicate a designer who created and/or initiated export of the graphics design.

The production data may include development production data associated with development of computing code for a graphics design. The development production data may be provided by development subsystem 104 to server subsystem 108 for storage in repository 122 and may include any information and/or content associated with development of computing code for a graphics design and/or development operations related to production of the computing code for the graphics design. For example, the development production data may indicate a developer who performed one or more development operations on the computing code.

The production data may include test production data associated with testing of computing code for a graphics design. The test production data may be provided by testing subsystem 106 to server subsystem 108 for storage in repository 122 and may include any information and/or content associated with testing of computing code for a graphics design and/or testing operations related to production of the computing code for the graphics design. For example, the test production data may indicate a tester who performed one or more testing operations on the computing code.

In certain embodiments, the production data stored in repository 122 may be organized within or include one or more databases. For example, production data for particular graphics may be stored in a particular database or in a particular database record included in a database in repository 122.

Production data stored in repository 122 may be accessible by one or more production subsystems such as design subsystem 102, development subsystem 104, and/or testing subsystem 106. Accordingly, design subsystem 102, development subsystem 104, and/or testing subsystem 106 may access, generate, update (e.g., add to and/or modify), utilize, or otherwise interact with production data stored in repository 122, such as in any of the ways described herein. Accordingly, the production data may include up-to-date information about the history and/or status of the production of graphics.

By providing design subsystem 102, development subsystem 104, and/or testing subsystem 106 with access to production data in repository 122 by way of a production tracing tag as described herein, system 100 may provide traceability of production operations, personnel, content, etc., which may facilitate collaboration and/or resource sharing between separate environments 112, 116, and 120. For example, a developer and/or a tester may be able to access and use design data (e.g., source code, screen comps, etc.) for use in, or in relation to, development and testing operations. In addition, personnel in each of the environments 112, 116, and 120 may be readily and/or programmatically able to trace the production of graphics to determine information about the production of the graphics, such as specific production operations that have been performed, specific personnel who contributed to the production (e.g., a designer who performed a design operation, a developer who performed a development operation, and/or a tester who performed a test operation), and/or timeframes during which personnel were responsible for the graphics, and use such information to advance production of the graphics.

A production of graphics may begin by a designer (e.g., designer 110) utilizing design subsystem 102 to create a graphics design (e.g., a graphics screen design), which may comprise a visual layout of one or more graphical elements as the graphical elements are intended to appear when the graphics represented by the graphics design are rendered and displayed on a display screen of a display device.

Figure 2:
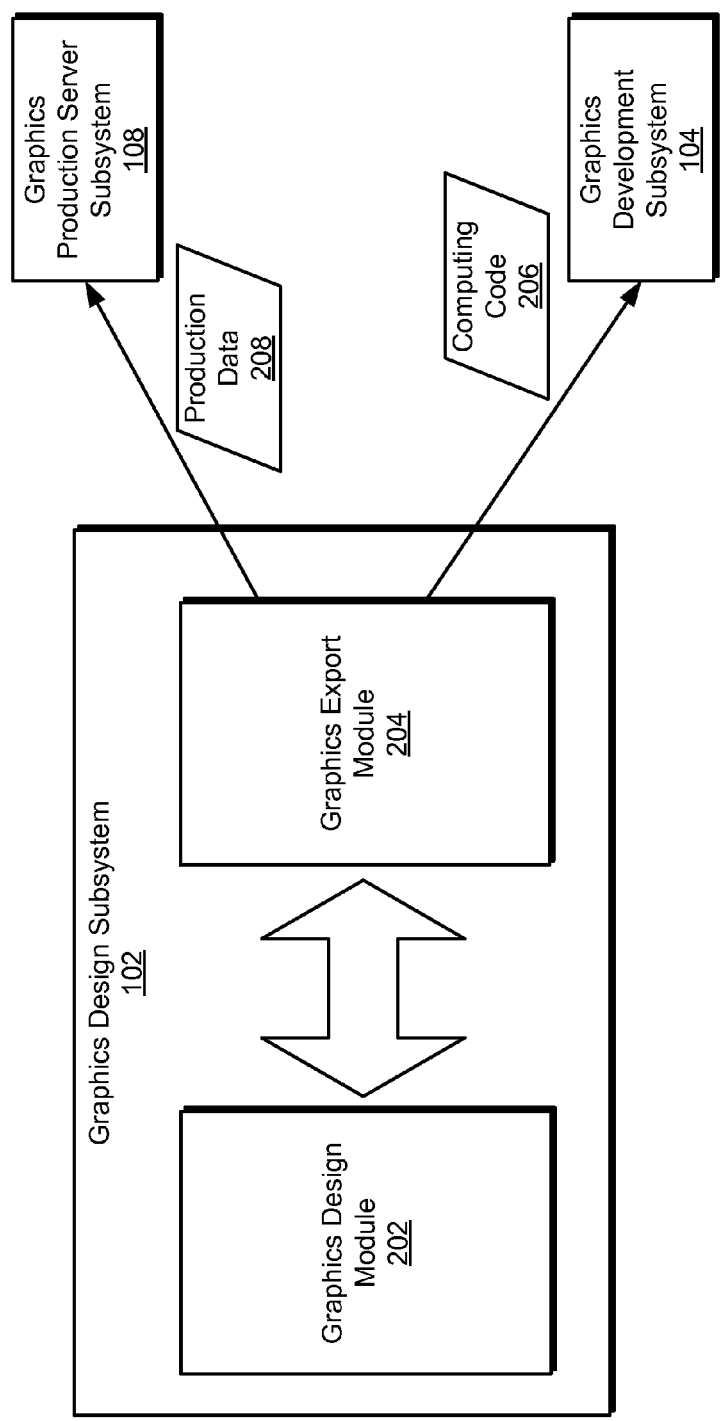
FIG. 2 illustrates exemplary components of a graphics design subsystem and export of computing code and design production data generated by the graphics design subsystem according to principles described herein.

FIG. 2 illustrates exemplary components of design subsystem 102. As shown in FIG. 2, design subsystem 102 may include a graphics design module 202 ("design module 202") and a graphics export module 204 ("export module 204") configured to communicate or otherwise interface with one another as shown.

Design module 202 may include or be implemented by one or more design tools with which a designer may interact to define a graphics design. In certain implementations, the tools may include one or more commercially available or proprietary graphics design software applications, such as Adobe Illustrator, Adobe Photoshop, and/or any other suitable graphics design software application(s).

Design module 202 may be configured to provide a user interface through which a designer may interact with design module 202 to define a graphics design. A graphics design may include a visual layout of one or more graphical elements configured to be displayed within dimensions of a graphics screen. The user interface may be configured to visually depict the graphics design such that the designer may interact with the visual depiction to define and/or modify the graphics design.

Design module 202 may be configured to maintain design data representative of a graphics design defined by a designer. The design data representative of the graphics design may be maintained at any suitable location, including as design data stored in a computer-readable storage medium that is local to design module 202 and/or design subsystem 102 or that is remote from design module 202 and/or design subsystem 102. The design data representative of the graphics design may be maintained in any suitable data format, such as a vector-based, bitmap-based, or other suitable data format.

Design data may include data representative each graphical element included in a graphics design. Data representative of a graphical element may include an identifier for the graphical element (e.g., an element or layer name), position data indicative of a position of the graphical element within the graphics design, pixel data for the graphical element (e.g., pixel data specifying hue, color, saturation, transparency, brightness, and/or other attributes of one or more pixels), text data (e.g., text string, font size, letting information, alignment, and/or other text properties), and any other data descriptive of or otherwise associated with the graphical element.

Design module 202 may include an interface through which export module 204 may interface with design module 202. Any suitable interface may be employed, such as one or more application program interfaces ("APIs").

Export module 204 may be configured to interface with design module 202, including interacting with design module 202 to access and/or facilitate processing of design data representative of a graphics design. Export module 204 may utilize the accessed data and/or the interface with design module 202 to automatically generate computing code 206 configured to be processed by a target computing device to render and present graphics within a GUI in accordance with the graphics design. In addition to generating the computing code, export module 204 may utilize the accessed design data and/or the interface with design module 202 to automatically generate production data 208 associated with the production of the graphics design and/or the computing code associated with the graphics design. Production data 208 generated by export module 204 may be in the form of design production data described above.

Computing code 206 and production data 208 generated by export module 204 may be made available by design subsystem 102 to one or more production subsystems (e.g., subsystems 102, 104, 106, and/or 108) of system 100. In certain embodiments, for example, computing code 206 may be provided directly to development subsystem 104 for use in development of the computing code 206 and production data 208 may be provided to server subsystem 108 for storage in repository 122, as shown in FIG. 2. In alternative examples, computing code 206 may be provided indirectly to development subsystem 104 and/or other production subsystems by export module 204 providing the computing code 206 to server subsystem 108 for storage in repository 122. Server subsystem 108 may make the computing code 206 stored in repository 122 accessible to development subsystem 104 and/or one or more other production subsystems included in system 100.

Figure 3:
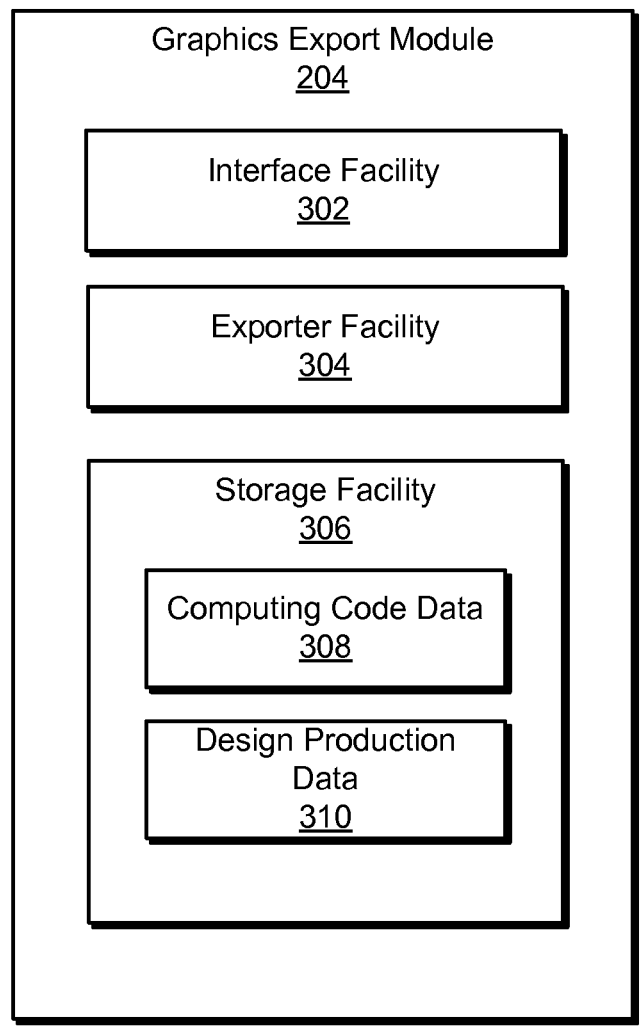
FIG. 3 illustrates exemplary components of a graphics export module according to principles described herein.

To further illustrate generation and export of computing code 206 and production data 208 associated with a graphics design, exemplary components of export module 204 shown in FIG. 3 will now be described. As shown, export module 204 may include, without limitation, an interface facility 302, an exporter facility 304, and a storage facility 306, which may be in communication with one another using any suitable communication technologies. It will be recognized that although facilities 302-306 are shown to be separate facilities in FIG. 3, any of facilities 302-306 may be combined into fewer facilities, such as into a single facility, or divided into more facilities as may serve a particular implementation.

Interface facility 302 may be configured to provide an interface through which export module 204 may interface with design module 202. Interface facility 302 may employ any suitable technologies to provide the interface with design module 202. For example, interface facility 302 may be configured to interface with one or more APIs of design module 202.

Through an interface with design module 202, export module 204 may access data representative of a graphics design maintained by design module 202. Additionally or alternatively, through an interface with design module 202, export module 204 may access and leverage one or more capabilities of design module 202. For example, export module 204 may instruct design module 202 to perform one or more operations to process design data representative of a graphics design and/or graphical elements included in the graphics design.

Interface facility 302 may be further configured to provide an interface through which export module 204 may interface with one or more production subsystems (e.g., development subsystem 104, testing subsystem 106, and/or server subsystem 108) included in system 100. Interface facility 302 may employ any suitable technologies for providing an interface with the production subsystems. Through an interface with one or more production subsystems, export module 204 may export data, including computing code 206 and/or production data 208 generated by export module 204, to one or more production subsystems included in system 100.

Interface facility 302 may be further configured to provide an interface through which a user may interact with export module 204. For example, a user such as a designer may provide user input to export module 204 through a user interface provided by interface facility 302 to direct export module 204 to perform one or more of the operations described herein. In certain implementations, for example, execution of one or more of the operations of export module 204 described herein may be initiated by a user selecting an "export" option provided in a user interface. Through the user interface, a user may provide production data such as contact information for the user, a description of production operations performed by the user, and any other information related to production of a graphics design and/or computing code for the graphics design within design environment 112.

Exporter facility 304 may be configured to utilize design data accessed through an interface with design module 202 to automatically generate computing code 206 configured to be processed by a target computing device to render and present graphics within a GUI in accordance with the graphics design. As used herein, the term "computing code" may refer to any code that may be processed by a computing device (e.g., an end user computing device) to render graphics for display in a GUI. As an example, computing code may include programming code such as source code, object code, or other executable code. As another example, computing code may include one or more data structures containing data representative of graphics, wherein the data in the one or more data structures is configured to be parsed by a computing device to render the graphics within a GUI. Examples of such data structures may include an Extensible Markup Language ("XML") data structure, a comma-separated value ("CSV") data structure, and any other data structure that may be parsed by a computing device to render graphics. Thus, computing code 206 generated by exporter facility 304 may be configured to be processed by a computing device to render graphics in accordance with a corresponding graphics design.

Exporter facility 304 may be configured to generate the computing code 206 based on design data maintained by design module 202 in any suitable way. In certain embodiments, exporter facility 304 may be configured to generate the computing code 206 in any of the ways described in co-pending U.S. patent application Ser. No. 12/983,109, filed Dec. 31, 2010, and entitled AUTOMATED GRAPHICAL USER INTERFACE DESIGN AND DEVELOPMENT SYSTEMS AND METHODS, the contents of which are hereby incorporated by reference.

In addition to generating computing code 206 based on design data representative of a graphics design, exporter facility 304 may utilize the design data accessed through interfacing with design module 202 to automatically generate production data 208. For example, design data may include information about a designer who worked on a graphics design and/or information about a developer to whom the generated computing code 206 is to be assigned for development. Additionally or alternatively, exporter facility 304 may utilize information provided by a designer (e.g., through interface facility 302) to generate production data 208. For example, interface facility 302 may prompt a designer to provide certain information about the designer, design operations, or a developer associated with a graphics design and/or the computing code 206.

Production data 208 may include any of the examples of design production data disclosed herein, including, for example, information about a designer (e.g., a personnel identifier, contact information, etc. for the designer) who created, exported, or otherwise worked on the graphics design, information about a developer (e.g., a personnel identifier, contact information, etc. for the developer) to whom development of computing code 206 is to be assigned, screen shots of the graphics design (e.g., a screenshot of the graphics design), information about the graphics design such as positions and/or dimensions of graphical elements in the graphics design, information about times that design and/or export operations were performed, and any other information related to production of the graphics design.

Exporter facility 304 may be configured to generate production data 208 in any suitable way. In certain embodiments, for example, production data 208 may be generated in accordance with a specific data structure and/or data format that one or more production subsystems (e.g., design subsystem 102, development subsystem 104, testing subsystem 106, and/or server subsystem 108) within system 100 are prepared to process.

Exporter facility 304 may be configured to tag the computing code 206 by inserting a production tracing tag ("tag") in the computing code 206. The tag may be inserted in the computing code 206 as part of or after the generating of the computing code 206.

The tag may be configured to be used by one or more production subsystems (e.g., design subsystem 102, development subsystem 104, and testing subsystem 106) within system 100 to access production data (e.g., production data 208) associated with production of graphics (e.g., creation of a graphics design and generation, development, testing of computing code 206 for the graphics). In certain examples, the tag may include a link to specific production data stored in repository 108. For example, the tag may include a unique identifier associated with production data 208 stored in repository 122. The unique identifier may be used by server subsystem 108 to index or otherwise identify or access the production data 208 included in the repository 122. For instance, the unique identifier may indicate a memory data structure and/or location (e.g., a database, a database record, a server address, etc.) in and/or at which the production data 208 is stored. Accordingly, the unique identifier included in the tag may function as a link to the production data 208 stored in repository 122.

In certain embodiments, export module 204 may be configured to obtain the unique identifier from server subsystem 108. For example, export module 204 may generate and export production data 208 to server subsystem 108 for storage in repository 122 as described above. Server subsystem 108 may assign a unique identifier to the production data 208 and store the production data 208 in the repository 122 such that the unique identifier may be used to index or otherwise access the production data 208. Server subsystem 108 may provide the unique identifier to export module 204, which may generate a tag based on the unique identifier and insert the tag into computing code 206. Accordingly, the unique identifier in the tag in the computing code 206 may be used by one or more production subsystems in system 100 to access the production data 208.

In other examples, the tag may include additional content and/or functionality that may be used in conjunction with the unique identifier to provide a link to specific production data stored in repository 122. For example, the tag may include one or more executable scripts that when executed by a production subsystem uses the unique identifier included in the tag to access and/or otherwise interact with specific production data stored in repository 122.

In other examples, the tag may additionally or alternatively include actual production data. For example, production data 208 may be stored within computing code 206.

Exporter facility 304 may insert the tag in the computing code 206 in any suitable way, such as by inserting data representative of the tag in a predefined location and/or in accordance with a predefined format or data structure within the computing code 206. In certain examples, the tag may be inserted as a comment (e.g., as a lead or end comment) and/or within a comments section in the computing code 206. The tag may include an indicator configured to indicate that the tag is a production tracing tag. The indicator may be detectable by one or more production subsystems included in system 100 such that the production subsystems may detect and use the tag as described herein.

FIG. 4 illustrates an example of computing code 206 having a production tracing tag 402 ("tag 402") included therein. As shown, tag 402 may be located within a comments section of the computing code 206 and may include an indicator (e.g., a predefined sequence of characters such as "Production_Tracing_Tag:") indicating that the data ("6299477380" in brackets) following the indicator is the actual content of the tag 402. In this example, the actual content of the tag 402 is a unique identifier that is configured to be used by a production subsystem to access the production data 208 stored in repository 122.

Returning to FIG. 3, storage facility 306 of export module 204 may be configured to maintain computing code data 308 representative of computing code generated by exporter facility 304 and design production data 310 representative of design production data related to production operations associated with production of graphics, including creation of the graphics design for the graphics and generation of the computing code based on the graphics design. Storage facility 306 may be configured to maintain additional and/or alternative data as may suit a particular implementation.

Exporter facility 304 of export module 204 may be configured to export generated computing code 206 in which a production tracing tag has been inserted. In addition, exporter facility 304 may be configured to export production data 208 in the form of design production data 310. Export facility 304 may export computing code 206 and production data 208 for access by one or more production subsystems included in system 100, including by exporting production data 208 to server subsystem 108 for storage in repository 122 and exporting computing code 206 to development subsystem 104 for development of the computing code 206, as shown in FIG. 2.

Export of computing code 206 by export module 204 for access by one or more production subsystems included in system 100 may be performed in any suitable way. For example, data representative of the computing code 206 may be transmitted directly from design subsystem 102 to one or more other production subsystems (e.g., development subsystem 104 and/or testing subsystem 106). As another example, data representative of the computing code 206 may be transmitted by design subsystem 102 to server subsystem 108, which may store the computing code 206 in repository 122 and send a notification message to one or more production subsystems (e.g., development subsystem 104 and/or testing subsystem 106) to indicate that the computing code 206 is available for access.

After computing code 206 and associated production data 208 have been exported by export module 204, one or more production subsystems included in system 100 may access and use the computing code 206 and production data 208 to advance production of the computing code 206. The one or more production subsystems may also update the production data 208 to reflect production operations performed by the production subsystems. To this end, each production subsystem may include a production tracing module that is configured to detect and use a production tracing tag included in the computing code 206 to access and use production data 208 and to update the production data 208 to reflect performance of production operations.

Figure 5:
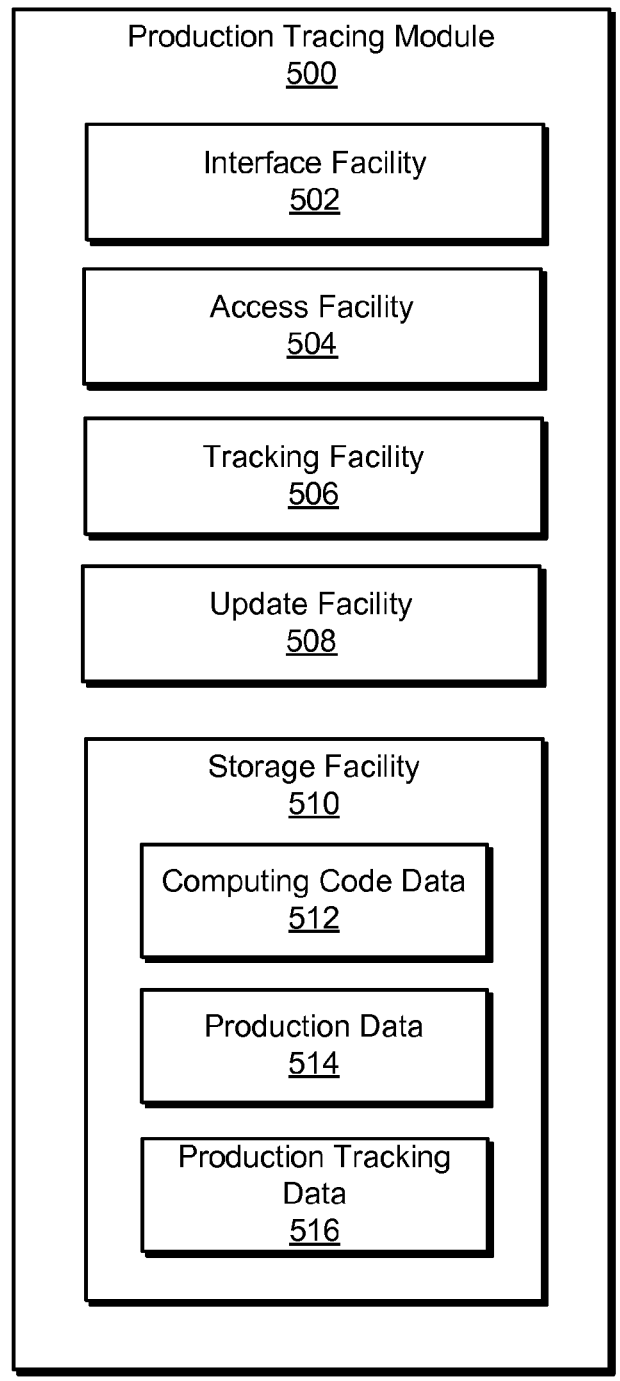
FIG. 5 illustrates an exemplary production tracing module according to principles described herein.

To illustrate, FIG. 5 shows an exemplary production tracing module 500, which may be included in or otherwise implemented by each production subsystem included in system 100. As shown in FIG. 5, production tracing module 500 may include, without limitation, an interface facility 502, an access facility 504, a tracking facility 506, an update facility 508, and a storage facility 510, which may be in communication with one another using any suitable communication technologies. It will be recognized that although facilities 502-510 are shown to be separate facilities in FIG. 5, any of facilities 502-510 may be combined into fewer facilities, such as into a single facility, or divided into more facilities as may serve a particular implementation.

Interface facility 502 may provide one or more interfaces through which production tracing module 500 may interface with one or more other modules or components of the production subsystem in which the production tracing module 500 is included. For example, a production tracing module 500 included in design subsystem 102 may interface with design module 202, export module 204, and/or any other components of design subsystem 102 such that production data accessed by the production tracing module 500 may be used in production operations performed by design subsystem 102 and production operations performed by design subsystem 102 may be tracked and used to update the production data. As another example, a production tracing module 500 included in development subsystem 104 may interface with one or more other components of development subsystem 104 such that production data accessed by the production tracing module 500 may be used in production operations performed by development subsystem 104 and production operations performed by development subsystem 104 may be tracked and used to update the production data. As another example, a production tracing module 500 included in testing subsystem 106 may interface with one or more other components of testing subsystem 106 such that production data accessed by the production tracing module 500 may be used in production operations performed by testing subsystem 106 and production operations performed by testing subsystem 106 may be tracked and used to update the production data. Interface facility 502 may include any suitable technologies to provide an interface between production tracing module 500 and one or more other components included in the same production subsystem in which the production tracing module 500 in included.

Access facility 504 may be configured to access computing code 206. In certain examples, access facility 504 may access computing code 206 from another component included in the same production subsystem in which the production tracing module 500 is included. In other examples, access facility 504 may be configured to access computing code 206 by reserving (i.e., checking out) the computing code 206 from repository 122 for production related to the computing code. After production operations have been performed for the computing code 206, access facility 504 may terminate the reservation for the computing code by returning (i.e., checking in) the computing code 206 to repository 122.

Access facility 504 may be configured to access production data 208 associated with production of the computing code 206. For example, access facility 504 may be configured to parse computing code 206 to detect a production tracing tag and to use the tag to access production data 208 associated with production of the computing code 206, such as in any of the ways described herein.

Access facility 504 may be configured to access specific data included in the production data 208 and to provide the specific data to one or more components of the production subsystem in which the production tracing module 500 is included for use by the one or more components in, and/or in conjunction with or relation to, performance of one or more production operations performed by the production subsystem. For example, design subsystem 102 may use the accessed production data 208 for one or more graphics design operations, graphics development subsystem 104 may use the accessed production data 208 for one or more development operations, and graphics testing subsystem 106 may use the accessed production data 208 for one or more testing operations.

To illustrate, accessed production data 208 may be used by a production subsystem to provide information about personnel associated with production of graphics. This may allow a user operating the production subsystem to readily determine who performed design, development, and/or testing operations during production of the graphics. For example, a tester may identify a "bug" in computing code 206. The tester may utilize a production tracing module 500 included in testing subsystem 106 to access production data 208 for the computing code 206 and readily determine personnel to be notified of the "bug" (e.g., a designer and/or developer indicated in the production data 208). As another example, accessed production data 208 may be used by a production subsystem to present content and/or information about graphics and/or production of graphics. For instance, a screen comparable representative of a designer's intended screen layout of graphics and included in the production data may be accessed and displayed for consideration by a user in conjunction with performance of one or more production operations, such as development and/or testing of computing code for the graphics. Accordingly, a developer may be able to view a display of the screen comparable provided by development subsystem 104 in conjunction with performance of one or more development operations. These examples are illustrative only. Accessed production data may be similarly used in and/or in conjunction with one or more production operations performed by one or more production subsystems included in system 100 to advance production of graphics.

Tracking facility 506 may be configured to track and record production operations performed by the production subsystem in which production tracing module 500 is included. This may be accomplished in any suitable way, such as by tracking facility 506 using an interface provided by interface facility 502 to detect performance of a production operation (e.g., a build of computing code 206, a test of computing code 206, etc.) by a component of the production subsystem in which the production tracing module 500 is included. Tracking facility 506 may then add data representative of the performance of the production operation to a log to record the performance of the production operation. The added data may include any information about the production operation, including a description of the operation, times associated with the performance of the operation, and/or personnel who ordered and/or performed the operation.

Update facility 508 may be configured to update production data 208 to reflect performance of the tracked production operations. For example, update facility 508 included in a production tracing module 500 that is included in a production subsystem such as design subsystem 102, development subsystem 104, or testing subsystem 106 may provide production tracking data recorded by tracking facility 506 to server subsystem 108 for addition to the production data 208 stored in repository 122. Server subsystem 108 may add the production tracking data to the production data 208 to update the production data 208 stored in repository 122.

In certain examples, update facility 508 may be configured to automatically begin tracking production operations in response to a first predefined production operation, such as access facility 504 checking out computing code 206 from repository 122 for production, and to automatically update production data 208 in response to a predefined production operation, such as access facility 504 checking in computing code 206 to repository 122. Accordingly, any production operations performed in relation to computing code 206 while computing code 206 is checked out to the production subsystem may be tracked and used to update the production data 208 in repository 122 such that the production data 208 is up to date and reflects the performance of the production operations. In certain implementations, update facility 508 may include or employ one or more batch scripts configured to be executed to update production data 208 stored in repository 122.

The updating of production data 208 stored in repository 122 may utilize the production tracing tag included in the computing code 206. For example, update facility 508 may access and use the production tracing tag to send data representative of updates to server subsystem 108 for inclusion in the appropriate production data 208 stored in repository 122. For instance, a unique identifier associated with the specific production data 208 may be included in the computing code 206 and used by update facility 508 to direct the updates to the appropriate production data 208. In the above-described or similar manner, each production subsystem may be configured to update production data stored in repository 122.

Storage facility 510 may be configured to maintain computing code data 512 representative of computing code accessed by access facility 504, production data 514 representative of production data accessed by access facility 504, and production tracking data 516 generated by tracking facility 506. Storage facility 306 may be configured to maintain additional and/or alternative data as may suit a particular implementation.

To further facilitate an understanding of system 100 and the corresponding principles disclosed herein, an exemplary production of graphics within system 100 will now be described in reference to components of system 100. While the exemplary production illustrates an end-to-end flow of production operations in relation to specific graphics, this is illustrative only. The principles associated with the exemplary production flow may apply to other productions of other graphics in system 100.

Figure 6:
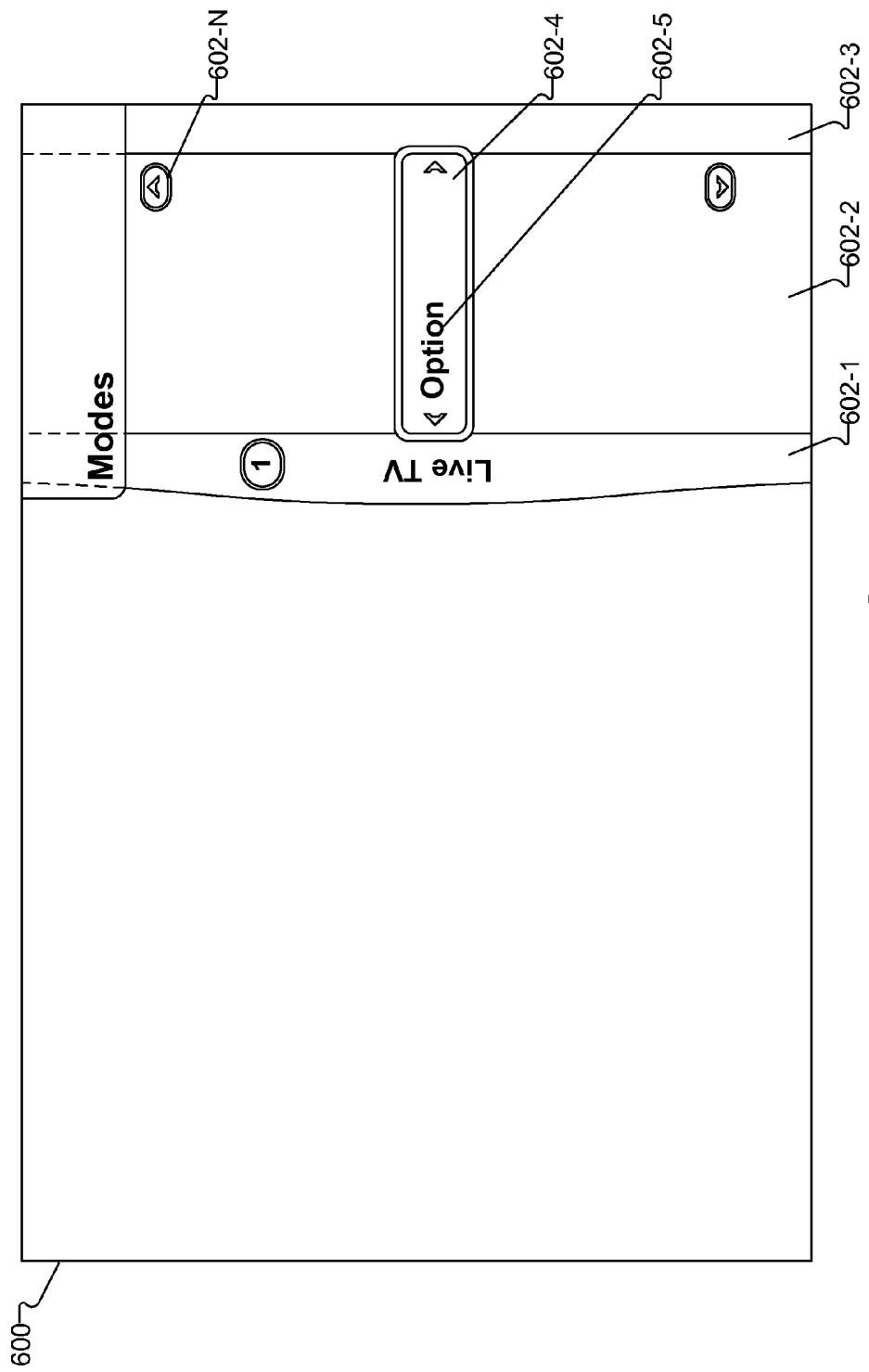
FIG. 6 illustrates a visual depiction of a graphics screen layout design according to principles described herein.

The graphics production may begin with designer 110 using design subsystem 102 to create a graphics design for graphics. For example, designer 110 may use design module 202 of design subsystem 102 to create a graphics design in the form of a graphics screen design. FIG. 6 illustrates a visual depiction of an exemplary graphics screen design 600. As shown, graphics screen design 600 may include one or more graphical elements, such as, but not limited to, graphical elements 602-1 through 602-N, positioned within dimensions of graphics screen design 600 to form a visual layout of the graphical elements. Graphical elements, such as graphical elements 602-1 through 602-N, may be layered in a particular order within a graphics screen design.

In some examples, each graphical element included in graphics screen design 600 may correspond to different logical construct known as a layer in graphics screen design 600. Design module 202 may maintain and present data representative of the layers in graphics screen design 600. For example, FIG. 7 illustrates an ordered list 700 of layers associated with graphics screen design 600. The order of the layers in list 700 may represent an order in which the layers are layered in graphics screen design 600. List 700 may also specify information about the layers. For example, row 702-1 in list 700 may represent a layer corresponding to a particular graphical element included in graphics screen design 600. Row 702-1 may include a thumbnail image 704-1 of the graphical element, a layer name 706-1 (e.g., "left arrow"), and/or any other information related to the graphical element.

Designer 110 may define layer names. In certain examples, export module 204 may be configured to perform or to refrain from performing one or more operations in response to and/or based on the layer names. Accordingly, designer 110, who has knowledge of capabilities of export module 204, may define layer names to cause export subsystem 104 to perform or refrain from performing operations on certain layers. For example, designer 110 may create a layer within graphics screen design 600 that contains design production data 310. To illustrate, row 702-2 in list 700 may represent a layer that contains design production data 310 provided by designer 110. A layer name 706-2 for the layer may include an indicator (e.g., a predefined sequence of characters such as "Production Information") that indicates to export module 204 that the layer contains design production data 310 for graphics screen design 600. The layer may include any design production data 310 provided by designer 110, such as information about designer 110 (e.g., a personnel identifier, contact information, etc.) and/or about a developer to be tasked with developing graphics based on graphics screen design 600.

When designer 110 is finished defining GUI screen design 600 with design module 202, designer 110 may provide input, such as a single selection of an export command, to initiate processing by export module 204 to generate and export computing code 206 for graphics screen design 600. In response to the user input, export module 204 may automatically perform one or more of the operations described herein to generate and export computing code 206 for graphics screen design 600. As described above, as part of or in relation to generating the computing code 206, export module 204 may insert a production tracing tag 402 in computing code 206.

Export module 204 may export the generated computing code 206 for access by one or more production subsystems of system 100, including by exporting computing code 206 directly or indirectly to development subsystem 104 as described herein for development of computing code 206.

In association with generation and export of computing code 206, export module 204 may also generate and export production data 208 associated with production of computing code 206. For example, export module 204 may generate production data 208 from design production data 310 maintained by design module 202, such as from a layer of graphics screen design 600 that contains design production data 310 as described above. Additionally or alternatively, export module 204 may prompt designer 110 to input design production data 310. In the present example, export module 204 may generate and export production data 208 to server subsystem 108 for storage in repository 122.

Developer 114 may utilize development subsystem 104 to develop computing code 206 exported by export module 204 of design subsystem 102. The development of computing code 206 may include developer 114 and/or development subsystem 104 performing one or more development operations on computing code 206 (such as coding functionality of a graphics screen into the computing code 206).

The development may include developer 114 using development subsystem 104 to reserve the computing code 206 for development work by developer 114. While the computing code 206 is checked out by developer 114, one or more development operations may be performed. In relation to the development operations, development subsystem 104 may use the production tracing tag 402 included in the computing code 206 to access and utilize production data 208 associated with production of the computing code 206. For example, development subsystem 104 may use the production tracing tag 206 to access production data 208 such as a screen comparable source file included in production data 208. Development subsystem 104 may display a visual depiction of the screen comparable for use by developer 114. The display of the screen comparable may help developer 114 understand intentions of designer 110 for the graphics screen, which may help developer 114 perform development operations to develop computing code 206 in a way that aligns with the intentions of designer 110. As another example, developer 114 may have a question about how to develop computing code 206. The developer 114 using development subsystem 104 may access production data 208 in the form of information about designer 110 who created graphics screen design 600 such that developer 114 may readily contact the appropriate designer 110 about the question.

A production tracing module 500 within development subsystem 104 may track the development operations performed by development subsystem 104 and/or developer 114 on computing code 206, as described above. Accordingly, when developer 114 checks the computing code 206 back in to repository 122, production data 208 for the computing code 206 may be updated to include information descriptive of the development operations performed on the computing code 206. For example, the production data 208 may be updated to include information specifying developer 114, a time period during which developer 114 checked out the computing code 206, and/or operations performed on the computing code 206 by development subsystem 104 and/or developer 114.

In certain examples, developer 114 may provide user input directing development subsystem 104 to generate a build of computing code 206 for test. The build of computing code 206 may be made available for access and testing by testing subsystem 106 and/or tester 118.

Tester 118 may utilize testing subsystem 106 to test a computing code 206 build. The testing may include tester 118 and/or testing subsystem 106 performing one or more testing operations on the computing code 206 build (such as performing predefined iterative tests on the computing code 206).

The testing may include tester 118 using testing subsystem 106 to reserve the computing code 206 for testing by tester 118. While the computing code 206 is checked out by tester 118, one or more testing operations may be performed. In relation to the testing operations, testing subsystem 106 may use the production tracing tag 402 included in the computing code 206 to access and utilize production data 208 associated with production of the computing code 206. For example, testing subsystem 106 may use the production tracing tag 206 to access production data 208 such as a screen comparable source file included in production data 208. Testing subsystem 106 may display a visual depiction of the screen comparable for use by tester 118. The display of the screen comparable may help tester 118 understand intentions of designer 110 for the graphics screen, which may help tester 118 perform testing operations to test computing code 206 in a way that checks whether the computing code 206 has been developed to align with the intentions of designer 110. As another example, tester 118 may identify a "bug" in computing code 206. The tester 118 using testing subsystem 106 may access production data 208 in the form of information about designer 110 who created graphics screen design 600 and/or developer 114 who developed the computing code 206 such that tester 118 may readily contact the appropriate designer 110 and/or developer 114 about the "bug." Accordingly, a responsible party may be readily traced and identified from the production data 208, contacted, and tasked with fixing the "bug" in a timely and streamlined manner such that production may be advanced.

A production tracing module 500 within testing subsystem 106 may track the testing operations performed by testing subsystem 106 and/or tester 118 on computing code 206, as described above. Accordingly, when tester 118 checks the computing code 206 back in to repository 122, production data 208 for the computing code 206 may be updated to include information descriptive of the testing operations performed on the computing code 206. For example, the production data 208 may be updated to include information specifying tester 118, a time period during which tester 118 checked out the computing code 206, and/or operations performed on the computing code 206 by testing subsystem 106 and/or tester 118. Accordingly, designer 110 and/or developer 114 may readily access, in the updated production data, information about testing performed by testing subsystem 106 and/or tester 118.

In this manner, production data 208 and the production tracing tag 402 included in computing code 206 for use in accessing and/or updating the production data 208 may provide a graphics production environment in which production operations may be tracked and production data 208 representative of the production operations may be readily accessed (by way of the tag 402 in the computing code) such that the production data 208 may be used to advance production operations across separate production environments. Accordingly, collaboration and/or resource sharing between separate environments may be facilitated, and overall graphics production that includes production operations in separate environments may be streamlined.

In certain examples, server subsystem 108 may utilize the production data 208 to determine to which production subsystems included in system 100 to send a notification message. For instance, server subsystem 108 may determine from the production data 208 that computing code 206 generated by design subsystem 102 is to be assigned to a particular developer. Server subsystem 108 may then send a notification message to development subsystem 104 to notify the developer that the computing code 206 is available for access and development. As another example, after development operations are complete, server subsystem 108 may determine from updated production data 208 that developed computing code 206 (e.g., a build of the computing code 206) is to be assigned to a particular tester for testing. Server subsystem 108 may then send a notification message to testing subsystem 106 to notify the tester that the computing code 206 is available for access and testing. As yet another example, server subsystem 108 may determine from updated production data 208 that testing of the computing code 206 produced an incident report (e.g., a "bug" was found) and that a particular developer or designer associated with the computing code 206 should be notified of the incident report. Server subsystem 108 may then send a notification message to design subsystem 102 and/or development subsystem 104 to notify the designer or developer of the incident report. In this or a similar manner, production data 208 may be used to intelligently notify parties associated with production of graphics of certain production operations and/or tasks, such that production may be advanced.

After production operations have been completed, developer 114 using development subsystem 104 may generate a final build (e.g., a release build) of the computing code 206. The generation of the final build of the computing code 206 may remove extraneous data from the computing code 206. For example, comments may be removed. In particular, the production tracing tag 402 may be removed.

Graphics produced in system 100 may be usable as templates in other graphics and/or GUIs. For example, computing code 206 for graphics screen design 600 may be used as a graphics building block in another graphics design, such as in a design of a menu GUI for a media content processing device (e.g., a set-top box device).

Figure 8:
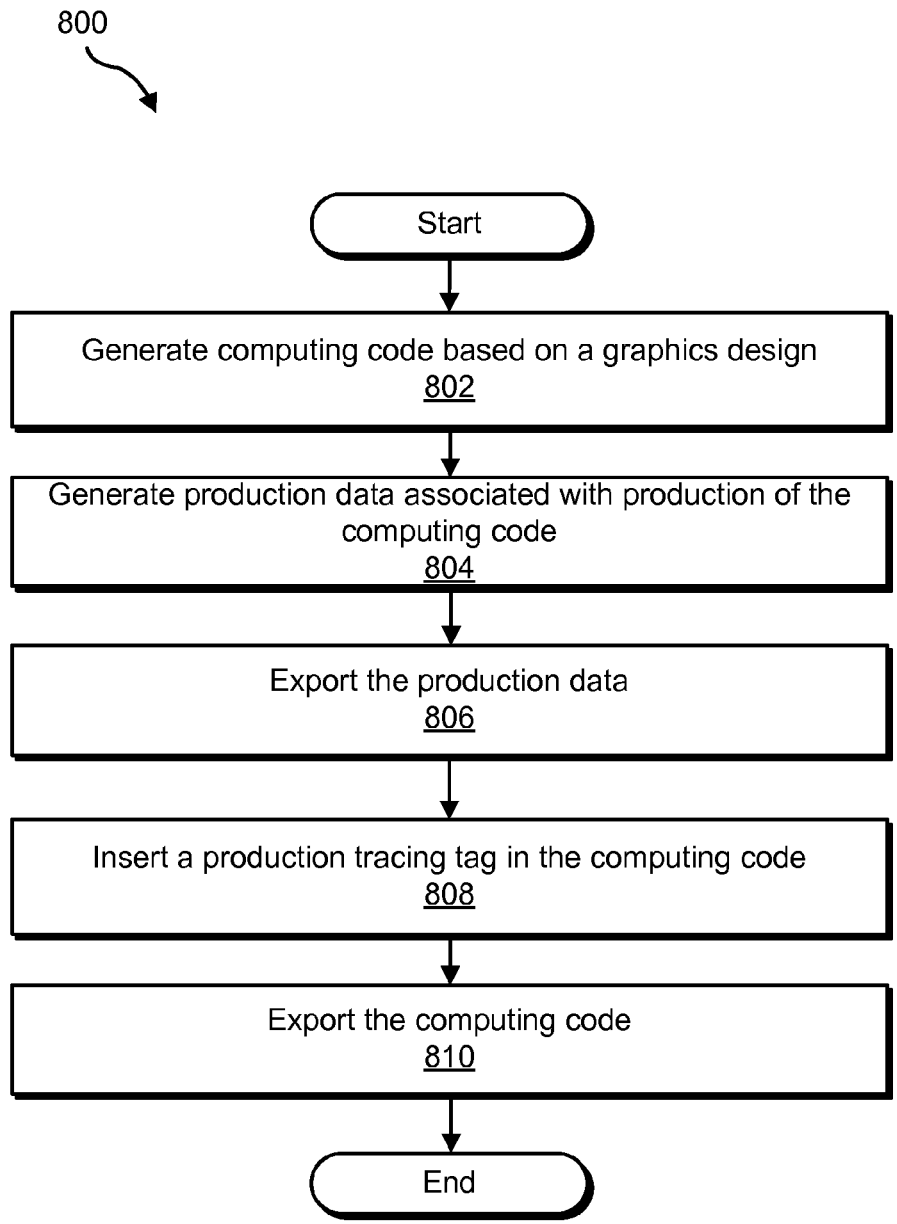
FIGS. 8-9 illustrate exemplary tag-based graphics production methods according to principles described herein.

FIG. 8 illustrates an exemplary tag-based graphics production method 800. While FIG. 8 illustrates exemplary steps according to certain embodiments, other embodiments may omit, add to, reorder, combine, and/or modify any of the steps shown in FIG. 8. The steps shown in FIG. 8 may be performed by export module 204 and/or any other component(s) of system 100.

In step 802, export module 204 generates computing code (e.g., computing code 206) based on a graphics design, such as described herein.

In step 804, export module 204 generates production data (e.g., production data 208) associated with production of the computing code, such as described herein.

In step 806, export module 204 exports the production data. For example, export module 204 may export the production data to server subsystem 108 for storage in repository 122, such as described herein.

In step 808, export module 204 inserts a production tracing tag (e.g., production tracing tag 402) in the computing code, such as described herein.

In step 810, export module 204 exports the computing code including the production tracing tag for access by one or more graphics production subsystems included in system 100, such as described herein.

Figure 9:
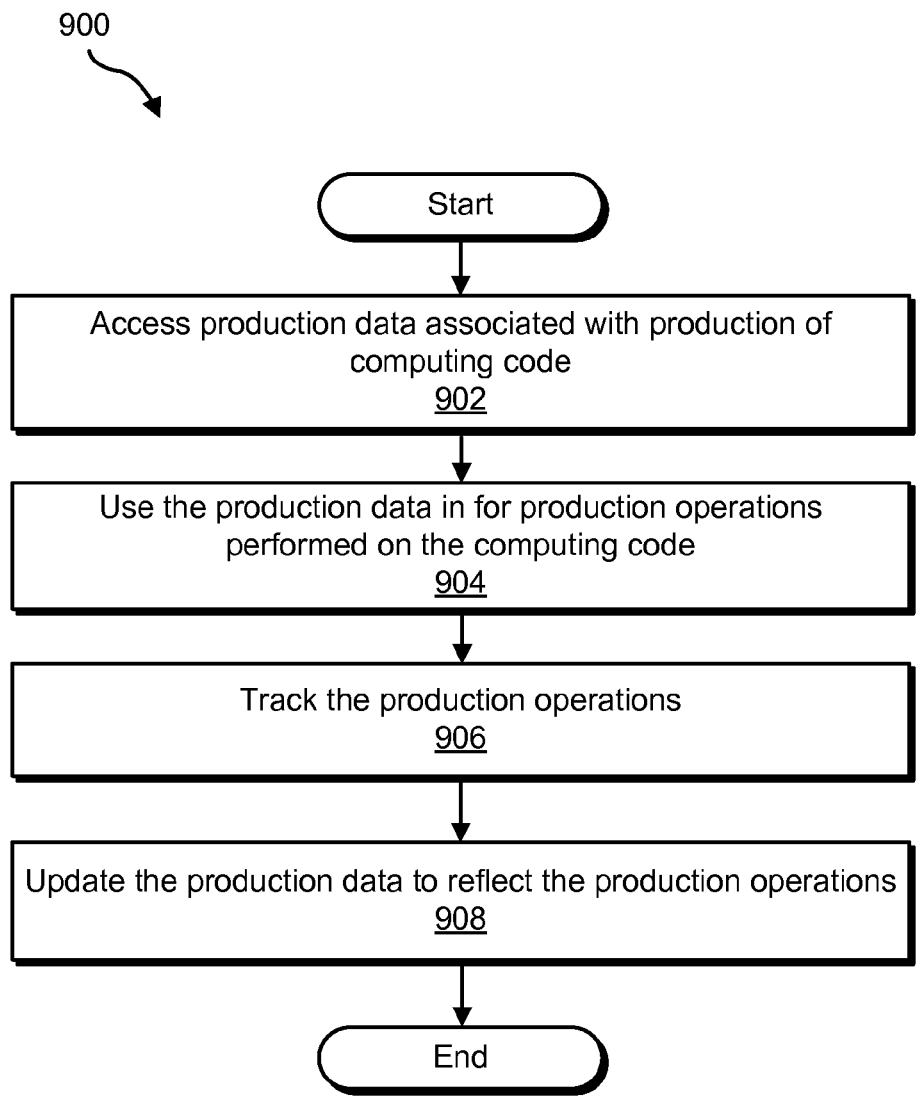

FIG. 9 illustrates another exemplary tag-based graphics production method 900. While FIG. 9 illustrates exemplary steps according to certain embodiments, other embodiments may omit, add to, reorder, combine, and/or modify any of the steps shown in FIG. 9. The steps shown in FIG. 9 may be performed by a graphics production subsystem (e.g., design subsystem 102, development subsystem 104, or testing subsystem 106) included in system 100 and/or any component(s) of the graphics production subsystem, such as production tracing module 500.

In step 902, a graphics production subsystem accesses production data (e.g., production data 208) associated with production of computing code (e.g., computing code 206), such as described herein.

In step 904, the graphics production subsystem uses the production data for production operations performed on the computing code, such as in any of the ways described herein.

In step 906, the graphics production subsystem tracks the production operations performed on the computing code, such as described herein.

In step 908, the graphics production subsystem updates the production data to reflect the production operations, such as described herein.

One or more of the steps of method 900 may be performed each time a graphics production subsystem included in system 100 accesses production data, performs production operations, and/or updates production data to reflect the production operations.

In certain embodiments, one or more of the components of system 100 (e.g., export module 204 and/or other components of system 100) and/or processes described herein may be implemented and/or performed by one or more appropriately configured computing devices. To this end, one or more of the systems and/or components described above may include or be implemented by any computer hardware and/or computer-implemented instructions (e.g., software), or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

One or more of the processes described herein may be implemented at least in part as instructions executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 10:
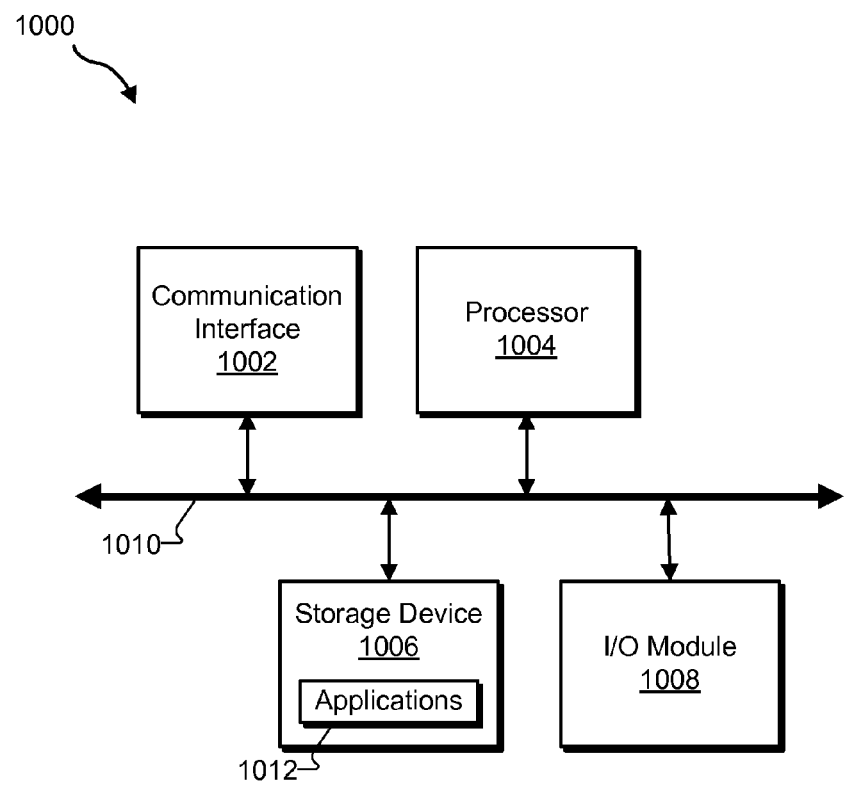
FIG. 10 illustrates an exemplary computing device according to principles described herein.

FIG. 10 illustrates an exemplary computing device 1000 configured to perform one or more of the processes described herein. In certain embodiments, computing device 1000 may implement export module 204, design subsystem 102, development subsystem 104, testing subsystem 106, server subsystem 108, and/or one or more other components of system 100. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. Communication interface 1002 may additionally or alternatively provide such a connection through, for example, a local area network (such as an Ethernet network), a personal area network, a telephone or cable network, a satellite data connection, a dedicated URL, or any other suitable connection. Communication interface 1002 may be configured to interface with any suitable communication media, protocols, and formats, including any of those mentioned above.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006.

For example, data representative of one or more executable applications 1012 configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphics and/or any other graphical content as may serve a particular implementation.

In certain implementations, one or more components of a graphics production subsystem included in system 100 may be implemented by computing device 1000. For example, applications 1012 may be configured to direct processor 1004 to perform one or more operations of design module 202, export module 204, and/or production tracing module 500.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:
1. A method comprising:
generating, by a graphics export module based on design data representative of a graphics design, computing code configured to be processed by a target computing device to render graphics within a graphical user interface in accordance with the graphics design;
generating, by the graphics export module, production data associated with production of the computing code;
exporting, by the graphics export module, the production data for storage in a data storage repository communicatively coupled to the graphics export module;
inserting, by the graphics export module, a production tracing tag in the computing code, the production tracing tag configured to be used to access, from the data storage repository, the production data associated with the production of the computing code; and
exporting, by the graphics export module, the computing code including the production tracing tag for access by at least one graphics production subsystem,
wherein the production tracing tag includes
a unique identifier associated with the production data in the data storage repository, and a script configured to be executed to use the unique identifier to access the production data in the data storage repository.

2. The method of claim 1, wherein:

the at least one graphics production subsystem is communicatively coupled to the data storage repository; and the method further comprises accessing and using, by the at least one graphics production subsystem, the production tracing tag included in the computing code to access the production data associated with the computing code stored in the data storage repository.

3. The method of claim 2, wherein:

the at least one graphics production subsystem comprises a graphics development subsystem: and the method further comprises using, by the graphics development subsystem, the production data accessed by way of the production tracing tag in relation to development of the computing code.

4. The method of claim 3, wherein the method further comprises updating, by the graphics development subsystem, the production data to reflect one or more development operations performed by the graphics development subsystem on the computing code.

5. The method of claim 2, wherein:

the at least one graphics production subsystem comprises a graphics testing subsystem; and the method further comprises using, by graphics testing subsystem, the production data accessed by way of the production tracing tag in relation to testing the computing code.

6. The method of claim 5, wherein the method further comprises updating, by the graphics testing subsystem, the production data to reflect one or more testing operations performed by the graphics testing subsystem on the computing code.

7. The method of claim 1, wherein the production tracing tag comprises a link to the production data in the data storage repository.

8. The method of claim 1, wherein the production data indicates at least one party involved in the production of the computing code.

9. The method of claim 8, wherein the at least one party comprises at least one of a designer of the graphics design, a developer of the computing code, and a tester of the computing code.

10. The method of claim 1, wherein the production data comprises a graphics comparable illustrative of a desired visual layout of the graphics.

11. The method of claim 1, wherein the production data comprises at least one of design production data associated with production of the graphics design, development production data associated with development of the computing code, and testing production data associated with testing of the computing code.

12. At least one non-transitory computer-readable medium comprising computer-executable instructions configured to direct a computing device to perform the method of claim 1.

13. The method of claim 1, further comprising:

receiving, by the graphics export module from a server subsystem associated with the data storage repository, the unique identifier associated with the production data in the data storage repository.

14. A system comprising:

at least one processor;

a graphics design subsystem configured to direct the at least one processor to generate computing code configured to be processed by a target computing device to render graphics for display in accordance with a graphics design, generate production data associated with production of the computing code, export the production data for storage in a data storage repository, insert a production tracing tag in the computing code, the production tracing tag including a unique identifier associated with the production data stored in the data storage repository and a script configured to be executed to use the unique identifier to access the production data in the data storage repository, and export the computing code including the production tracing tag; and at least one graphics production subsystem that is separate from the graphics design subsystem and configured to direct the at least one processor to access the exported computing code, and use the production tracing tag included in the computing code to access, from the data storage repository, the production data associated with the production of the computing code and stored in the data storage repository.

15. The system of claim 14, wherein the at least one graphics production subsystem comprises at least one of a graphics development subsystem, a graphics testing subsystem, and a project management subsystem.

16. The system of claim 14, further comprising a graphics production server subsystem that includes the data storage repository and that is communicatively coupled to the graphics design subsystem and the at least one graphics production subsystem that is separate from the graphics design subsystem;

wherein the at least one graphics production subsystem is configured to communicate with the graphics production server subsystem to access the production data stored in the data storage repository.

17. The system of claim 16, wherein the at least one graphics production subsystem is further configured to communicate with the graphics production server subsystem to update the production data stored in the data storage repository to reflect one or more production operations performed by the at least one graphics production subsystem on the computing code.

18. The system of claim 14, wherein the graphics design subsystem is further configured to direct the at least one processor to receive, from a server subsystem associated with the data storage repository, the unique identifier associated with the production data stored in the data storage repository.

19. A system comprising:

at least one processor; and a graphics export module configured to direct the at least one processor to generate, based on design data representative of a graphics design, computing code configured to be processed by a target computing device to render graphics within a graphical user interface in accordance with the graphics design, generate production data associated with production of the computing code, export the production data for storage in a data storage repository communicatively coupled to the graphics export module, insert a production tracing tag in the computing code, the production tracing tag configured to be used to access, from the data storage repository, the production data associated with the production of the computing code, and export the computing code including the production tracing tag, wherein the production tracing tag includes a unique identifier associated with the production data in the data storage repository, and a script configured to be executed to use the unique identifier to access the production data in the data storage repository.

20. The system of claim 19, further comprising at least one graphics production subsystem communicatively coupled to the data storage repository and configured to access and use the production tracing tag included in the computing code to access the production data associated with the computing code stored in the data storage repository.

21. The system of claim 20, wherein the at least one production subsystem comprises at least one of a graphics development subsystem configured to use the production data accessed by way of the production tracing tag in relation to development of the computing code and a graphics testing subsystem configured to use the production data accessed by way of the production tracing tag in relation to testing the computing code.

* * * * *